I. E. PALMER.
REVISABLE COMMERCIAL CATALOGUE AND ENVELOP THEREFOR.
APPLICATION FILED MAR. 30, 1912.

1,094,923.
Patented Apr. 28, 1914.
5 SHEETS—SHEET 1.

Witnesses:
Horace A. Crossman.
Carl L. Choate.

Inventor:
Isaac E. Palmer,
By Emery, Booth, Janney & Varney
Attys.

I. E. PALMER.
REVISABLE COMMERCIAL CATALOGUE AND ENVELOP THEREFOR.
APPLICATION FILED MAR. 30, 1912.
1,094,923.
Patented Apr. 28, 1914.
5 SHEETS—SHEET 2.
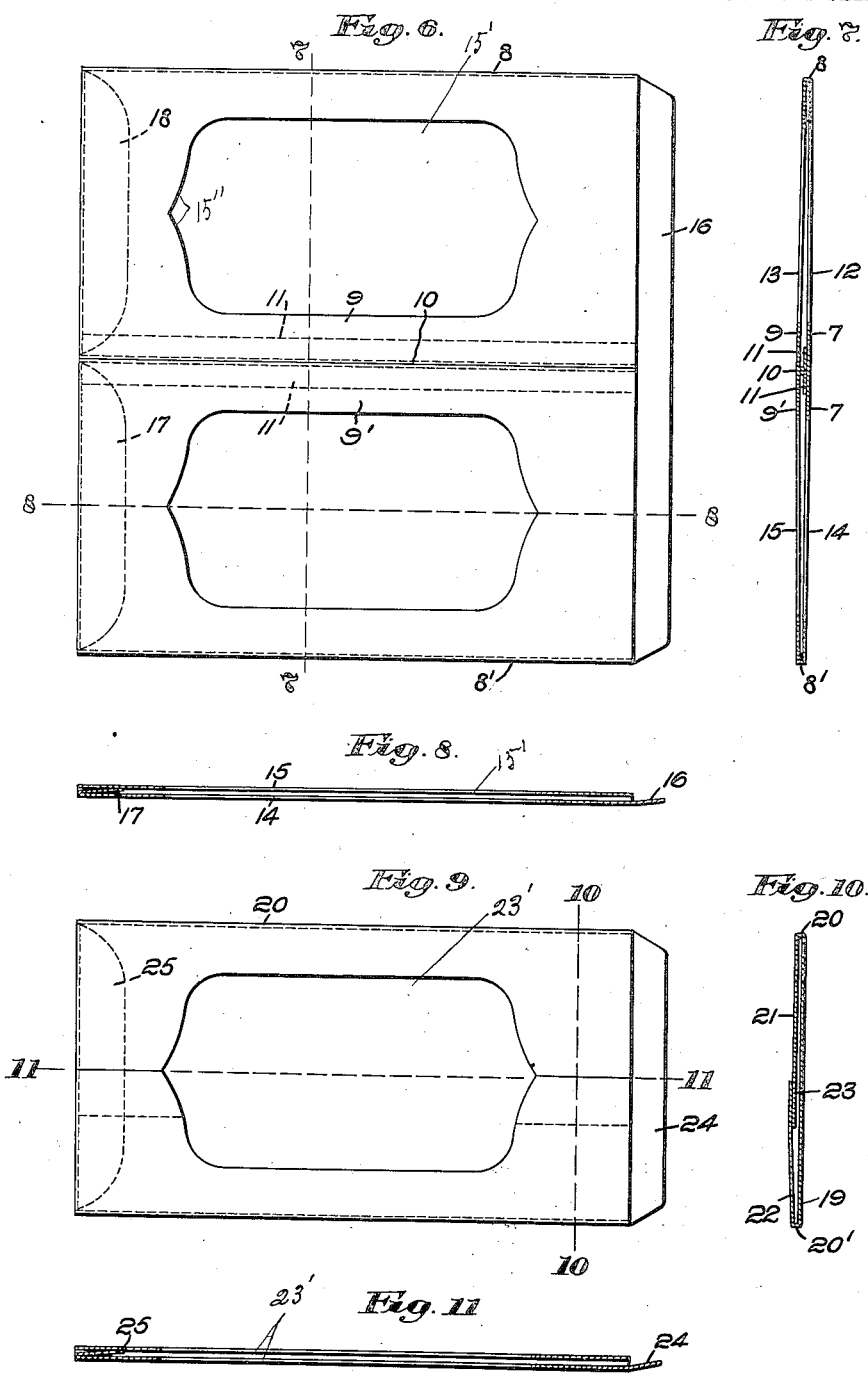

I. E. PALMER.
REVISABLE COMMERCIAL CATALOGUE AND ENVELOP THEREFOR.
APPLICATION FILED MAR. 30, 1912.
1,094,923.
Patented Apr. 28, 1914.
5 SHEETS—SHEET 3.
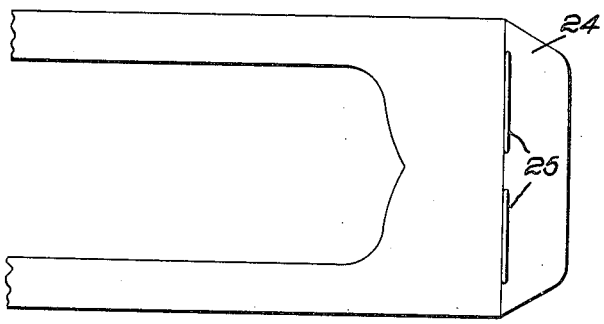
Fig. 12.
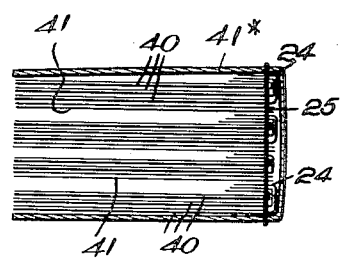
Fig. 19.
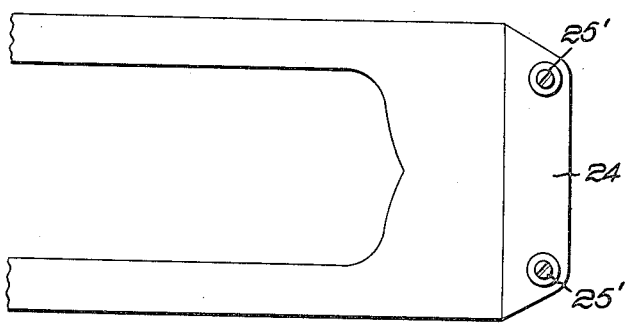
Fig. 13.
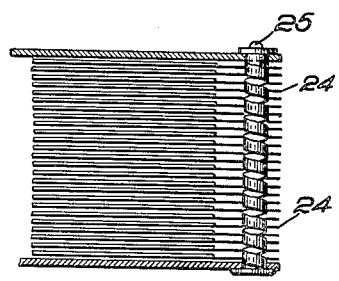
Fig. 13ᵃ.
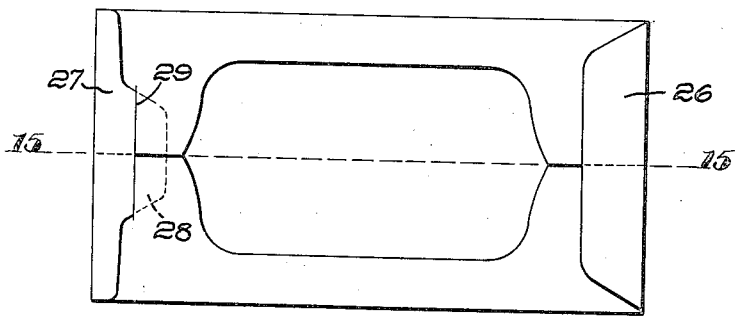
Fig. 14.
Fig. 15.
Witnesses:
Horace A. Crossman
Carl L. Choate.
Inventor:
Isaac E. Palmer,
by Emery, Booth, Janney & Varney
Attys I. E. PALMER.
REVISABLE COMMERCIAL CATALOGUE AND ENVELOP THEREFOR.
APPLICATION FILED MAR. 30, 1912.

1,094,923.

Patented Apr. 28, 1914.
5 SHEETS—SHEET 4.

Witnesses:
Horace A. Grossman
Carl L. Choate.

Inventor:
Isaac E. Palmer.
by Emery, Booth, Janney & Varney
Attys

I. E. PALMER.
REVISABLE COMMERCIAL CATALOGUE AND ENVELOP THEREFOR.
APPLICATION FILED MAR. 30, 1912.
1,094,923.
Patented Apr. 28, 1914.
5 SHEETS—SHEET 5.
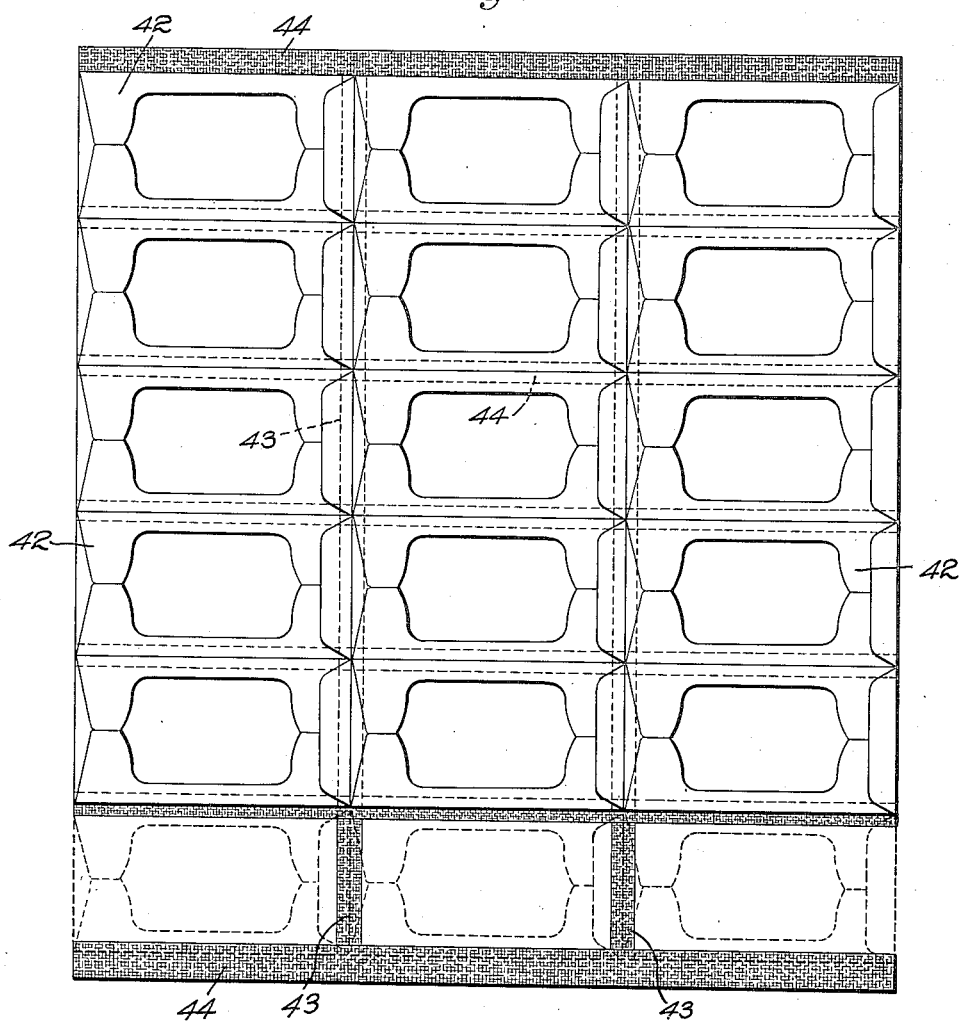

UNITED STATES PATENT OFFICE.

ISAAC E. PALMER, OF MIDDLETOWN, CONNECTICUT.

REVISABLE COMMERCIAL CATALOGUE AND ENVELOP THEREFOR.

1,094,923.

Specification of Letters Patent.

Patented Apr. 28, 1914.

Application filed March 30, 1912. Serial No. 687,406.

*To all whom it may concern:*

Be it known that I, ISAAC E. PALMER, a citizen of the United States, and a resident of Middletown, in the county of Middlesex and State of Connecticut, have invented an Improvement in Revisable Commercial Catalogues and Envelops Therefor, of which the following description, in connection with the accompanying drawings, is a specification, like characters on the drawings representing like parts.

This invention relates to revisable commercial catalogues and envelops therefor.

In order that the principle of the invention may be readily understood, I have disclosed certain embodiments thereof in the accompanying drawings, wherein—

Figure 1:
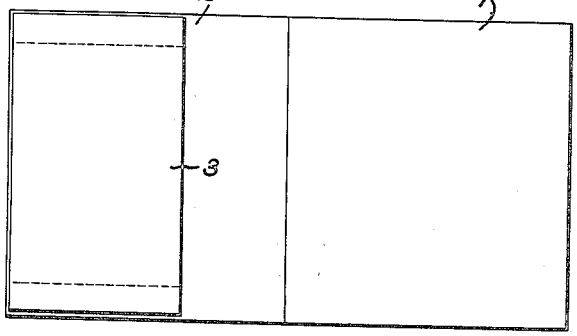
Figure 2:
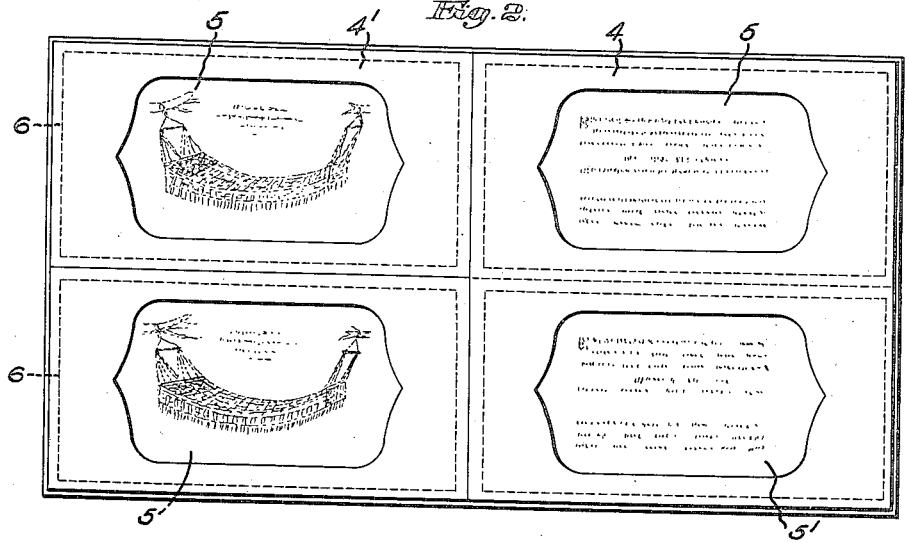
Figure 3:
Figure 4:
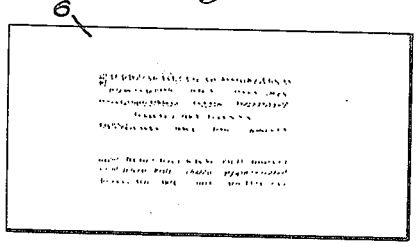
Figure 5:
Figure 16:
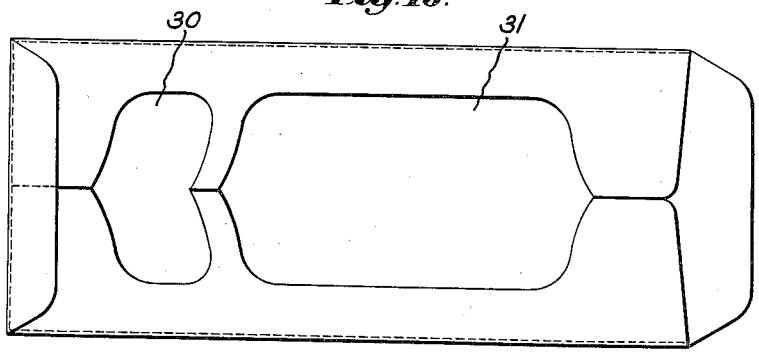
Figure 17:
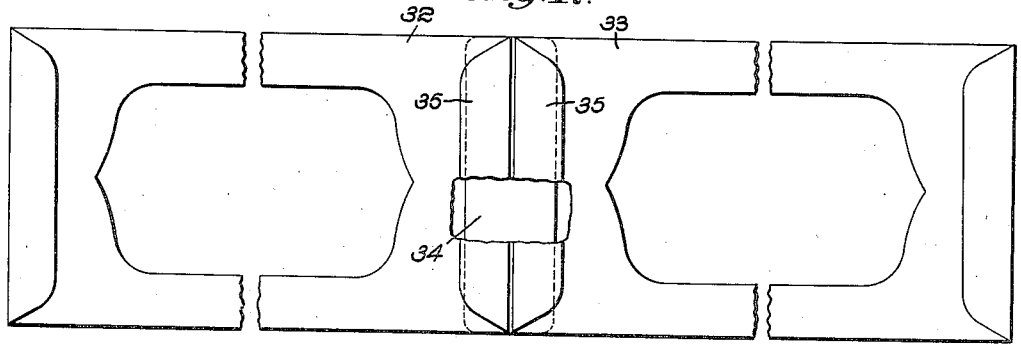
Figure 18:
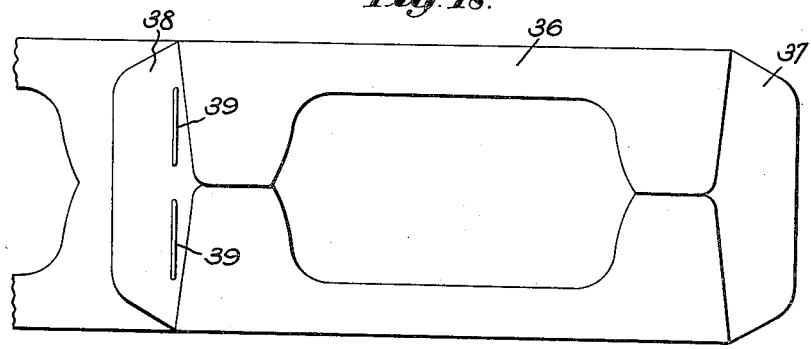

Figure 1 is a plan view of an open catalogue constructed in accordance with my invention, the upper cover being turned into open position. Fig. 2 is a plan view of a double catalogue embodying my invention, opened between the covers; Figs. 3 and 4 are plan views of opposite faces of a card or circular to be used with said catalogue; Fig. 5 is a transverse section through one of the covers of the catalogue and showing its pocket. Fig. 6 is a plan view of a duplex envelop or holder constituting one of the leaves of the double catalogue constituting one embodiment of my invention; Fig. 7 is a section upon the line 7—7 of Fig. 6; Fig. 8 is a section upon the line 8—8 of Fig. 6; Fig. 9 is a plan view of one form of single envelop constituting a leaf of the catalogue; Fig. 10 is a section upon the line 10—10 thereof; Fig. 11 is a section upon the line 11—11 thereof; Fig. 12 is a plan view of one end of an envelop showing how the same may be permanently bound into the catalogue; Fig. 13 is a similar view representing temporary binding means therefor; and Fig. 13ª is a section thereof; Fig. 14 is a plan view of a modified form of catalogue leaf, showing a slot and tongue construction for one flap; Fig. 15 is a section upon the line 15—15 of Fig. 14; Fig. 16 is a plan view representing an envelop having two inspection openings in one face thereof; Fig. 17 is a plan view representing two envelops secured end to end; Fig. 18 represents a portion of an open catalogue illustrating a bound-in envelop having an open flap at each end; Fig. 19 represents in vertical section one manner of binding the envelops into catalogue form; and Fig. 20 represents a portion of a chart made up from a series of envelops.

Catalogues of manufacturing establishments are customarily gotten up yearly. Their preparation of necessity requires great care and much time. In order that new lines of goods may be illustrated or otherwise advertised, the preparation of new material is required each year, but much advertised matter is of such a character that it is carried forward from year to year. Also from time to time certain lines of goods are revived after a lapse of a few years. This procedure requires cutting up catalogues of former years, the selection therefrom of such leaves as may be required for the new catalogue and the preparation of additional or new matter. A catalogue gotten up in the manner indicated is necessarily prepared in a comparatively short space of time extending at the most over but a few weeks, and it is frequently found that had more time been available for the selection of the materials to be advertised, a more effective collection might have been compiled.

In accordance with my invention I contemplate the preparation of a commercial catalogue wherein I may assemble from time to time throughout the year leaves from former catalogues, advertisements bearing upon new material, or samples of goods that are to be advertised. In this manner, I can rearrange the material from time to time by changing the order to which they are to be presented in the catalogue when issued in final form and make any desired additions thereto.

In accordance with the preferred embodiment of my invention, the catalogue is made up of a series of mailable units, preferably in the form of envelops, each adapted to receive a card or circular illustrating the object to be advertised, such, for example, as a hammock, and also if desired containing printed matter descriptive thereof. These envelops are preferably so constructed that they may be bound together either temporarily or permanently to constitute a catalogue, and they may be also individually mailed, preferably within an inclosing envelop, so that the recipient may insert the inner envelop and its card or circular in the catalogue, if the latter be temporarily bound, or he may withdraw the card or circular from one of the envelops of his temporary or permanently bound catalogue and substitute therefor the card or circular contained in the mailed envelop.

It is apparent that the commercial catalogue embodying my invention is capable of use with many different lines of manufacture. One important use thereof is in connection with textile industries and more especially those where cloth is woven and made up into various articles of manufacture. As a single instance of such line of manufacture, I may state that I have found the commercial catalogue embodying my invention to be peculiarly adapted for use in connection with textile establishments manufacturing woven hammocks. In such establishments heretofore so far as I am aware, yearly catalogues have been issued in book form, many of the leaves thereof displaying upon one face cuts of grades or types of hammocks and upon the opposite face descriptive matter pertaining thereto. As previously stated, these illustrations must yearly be changed to correspond to the new lines of goods that are being from time to time put upon the market. By the use of a commercial catalogue which shall contain pockets or holders for segregated leaves of catalogues or segregated sheets containing new descriptive or illustrative matter, or even samples of material, I may assemble the material for a prospective catalogue at leisure and in such a manner that it may be readily inspected without disarranging it, and yet may be shifted from time to time until in satisfactory and final form.

Preferably the pockets or holders of the catalogue are of such nature that one and sometimes both faces of each of the segregated sheets or leaves may be displayed for examination. Obviously this result may be accomplished in many different ways. Preferably, however, the catalogue is made up of a large number of envelops which are themselves loosely or detachably assembled, thus permitting substitutions, additions, shifting and removal. This may be accomplished by perforating at suitable points the inner edges of these catalogue leaves and then passing pins, split rings or other holding devices therethrough in such manner that the leaves are temporarily held together but may be rearranged. If desired, however, the leaves of the catalogue may be themselves bound together in permanent form and the material inserted in the pockets or holders from time to time may be shifted as desired. That is to say, instead of shifting the catalogue leaves themselves, their contents may be shifted. Each leaf of the catalogue, whether bound in permanent form or loosely assembled, is suitably made up so as to receive a sheet or sample.

Referring more particularly to the drawings and first to that form of the invention illustrated in Fig. 1, I have therein represented a catalogue made up of a series of envelops or holders permanently or temporarily bound together, the catalogue being preferably provided with blank or other pages bound with the envelops or holders, one of said pages being shown at 1, said catalogue having covers, one of which is represented as open at 2. Preferably the inner face of the cover is provided with a bellows or other pocket 3 (shown also in Fig. 5) opening toward the inner ends of the envelops.

In Fig. 2, I have represented an open duplex catalogue embodying my invention, each of the leaves being composed of duplex envelops 4, 4' bound together along their inner edges either temporarily or permanently, and each preferably provided with two inspection openings 5, 5'. If desired and preferably each face of each envelop is provided with a contents-inspection opening, so that both faces of the card or circular 6 represented in Figs. 3 and 4 may be displayed, or if desired two cards or circulars may be inserted back to back in a single envelop, so that one face of each may be displayed through the opposite openings in said envelop.

In Figs. 6, 7 and 8, I have represented in detail a duplex envelop constituting one leaf of the catalogue. Preferably this envelop is composed of a single sheet 7 transversely folded along parallel lines 8, 8' to form top and bottom edges, the folded over portions 9, 9' preferably substantially meeting as indicated at 10 and reversely folded at their edges as indicated at 11, 11, said edges 11, 11 being adhesively or otherwise secured to the body portion 7. Preferably this envelop is provided with four openings 12, 13, 14, 15; thus the envelop contains two pockets, each having two contents-inspection openings 15', each of which is preferably provided, as shown in Figs. 6 and 9, with inclined guiding edges 15'' at the end of the opening or openings the more remote from the sheet-insertion opening, which are there shown as meeting at an angle. The envelop is provided at one edge with a continuous flap 16, which preferably constitutes the binding flap and at its other end with two flaps 17, 18 for the reception pockets of the envelop. While the flaps 17, 18 may in certain instances be adhesively or otherwise secured to a face of the envelop, preferably said flaps are free, so that the display card may be inserted or removed through either end of the envelop. For ease of manipulation, I preferably insert the card through the outer end of the envelop, using the flaps 17, 18 and utilizing the flap 19 as a binding flap, as more fully disclosed hereinafter. It is obvious that the duplex form of envelop may be folded or constructed other than as described so as to effect the purpose of the invention.

In Figs. 9, 10 and 11, I have illustrated an envelop formed with but a single pocket, but intended to be used substantially as that shown in Figs. 6, 7 and 8. Preferably the envelop is composed of a single sheet 19 folded along parallel lines to form top and bottom edges 20, 20', the folded over portions 21, 22 being brought together and adhesively or otherwise secured as indicated at 23. Preferably each face of the envelop is provided with a display opening 23', so that both faces of a single card may be inspected therethrough, or opposite faces of two cards placed back to back. Preferably each end of the envelop is provided with a flap 24, 25 respectively, one of which, as 24, preferably constitutes a binding flap, and the other of which, as 25, constitutes a guarding flap for the insertion end of the envelop. In certain cases, however, the flap 25 may be adhesively or otherwise secured, so that the envelop has but a single open end.

In Fig. 12, I have represented one end of an envelop such as represented in Figs. 9, 10 and 11. Therein the flap 24 is represented as receiving preferably at or near its base, the binding threads or cords 25 by which the envelops are bound into permanent form as a revisable commercial catalogue.

In Fig. 13, I have represented the flap 24 of the same envelop as receiving temporary binding means 25' by which a series of envelops may be temporarily bound into a commercial catalogue, the individual envelop pages of which may be replaced or shifted. The temporary binding means 25 may be of any suitable character, but preferably I employ binding means, such as illustrated in my Patent No. 1,009,556, dated Nov. 21, 1911.

In Figs. 14 and 15, I have represented a modified form of envelop generally similar in character to that illustrated in Figs. 9, 10 and 11 and having two flaps 26, 27, one of which and preferably the flap 27, is provided with a tongue 28 receivable within a transverse slot 29, thereby insuring more positive retention of the contents of the envelop. In this form of the invention the flap 26 is preferably used as the binding flap for the reception of temporary or permanent binding means.

In Fig. 16, I have represented an envelop having therein two openings 30, 31 particularly intended for use with an advertising card having printed matter at or near one end, and a cut occupying more or less of the remaining portion of the same face of the card. In use the printed matter is visible through one of the openings, as, for example, the smaller opening 30, and the cut through the larger opening 31.

In Fig. 17, I have illustrated a further use of my invention, wherein are shown portions of two envelops 32, 33 secured together end to end, as for example by a separate strip 34. Each of the envelops is provided with a flap 35, 35 at its inner end, and preferably with similar flaps at the outer ends. The flaps 35 may constitute binding flaps if desired, whereby the envelops so connected may be bound into catalogue form, or the pair of envelops so connected may be used for display purposes otherwise than in a catalogue.

In Fig. 18, I have represented an envelop 36 having open flaps 37, 38 at the respective ends, the flap 37 being used to guard the outer insertion opening and the flap 38 being preferably used as a binding flap. If desired, the card or the like may be inserted at the end having the flap 38. The binding means 39 may be either permanent or temporary in character. The envelop here shown is structurally similar to that shown in Fig. 9, wherein, however, no means to secure a series of such envelops into catalogue form is shown.

In Fig. 19, I have represented in section a portion of a catalogue showing the preferred manner of binding the envelops together. Therein the several envelops are diagrammatically indicated at 40, each having a flap 24. Two, three or any other suitable number of these envelops are placed flatwise with their flaps nested together as illustrated, and a sufficient number of series of these envelops are placed together to make up a catalogue. Preferably also I employ blank pages as indicated at 41, which may be bound in at the front or back or intermediate portions of the catalogue. Then suitable binding means, either in the form of permanent binding cords or the like or temporary or loose leaf binding pins are passed through the flaps 24 at or near their bases, so as to bind the envelops together into catalogue form. Thus, the catalogue may be made up of the envelop units, blank pages and covers all bound together. In said Fig. 19 the covers are indicated at 41*. Preferably in the several forms of the invention the binding means, when of a permanent nature, passes through the bases of the flaps.

As already stated, the envelops constitute individual units which may be mailed separately as desired, and preferably within an outer envelop, although if desired the display envelop itself may constitute the mailing inclosure and receive the address upon any suitable portion of a face. The envelops may, however, be used in other ways. For example, and as diagrammatically indicated in Fig. 20, I may make up a chart or similar display device from a series of envelops 42 which are secured together as a large sheet or chart by means of strips 43, 44 running transversely and longitudinally thereof between the display opening of the envelops at one face thereof. Preferably the securing strips are at the back of the chart or assembled envelops, so that the flaps of the envelops are at the front face thereof and are adapted to be freely manipulated. In this use of the invention, one flap of each envelop may be permanently secured to the body thereof, thus leaving but one end of the envelop open for insertion of the display card. If desired, however, the envelops may be provided with insertion openings at each end.

So far as I am aware, I am the first to provide a revisable catalogue, the leaves whereof are composed of separate envelop units bound together temporarily, as by means of end flaps, thus permitting the envelops to be individually mailed from a manufacturing establishment to holders of temporarily bound catalogues, thus permitting the recipients to substitute or add such envelops to their own temporary catalogues.

Throughout the specification I have referred to the provision of inspection openings. It is, of course, to be understood that in each form of the invention, the inspection opening may be in the form of a transparent portion or panel, thus constituting an inspection area herein termed an opening. Also if desired the envelop may have an actual opening itself covered by a transparent strip or sheet, or if desired some suitable open mesh fabric or other material may be employed to cover the opening, being secured to the face of the envelope.

I am aware that it has been proposed heretofore to form a photograph album of a series of leaves each folded and joined at the edges to constitute pockets and provided with contents inspection openings and bound in permanent form, as shown in the patent to Tapley, No. 87,804, March 16, 1869. My invention is clearly distinguished therefrom, inasmuch as each of the envelops from which the catalogue is made is complete in itself, and when segregated from the other envelops of the catalogue is a complete mailable unit.

Having thus described one illustrative embodiment of my invention, I desire it to be understood that although specific terms are employed, they are used in a generic and descriptive sense and not for purposes of limitation. the scope of the invention being set forth in the following claims.

Claims.

1. A mailable, bindable, catalogue-sheet-receiving envelop provided at each end with a closing flap, one of said flaps constituting a binding flap for securing a series of said envelops into catalogue form, the envelop having a continuous pocket extending from flap to flap and also having one or both faces provided with a contents-inspection area.

2. A revisable catalogue comprising a plurality of card receiving envelopes adapted to be secured together, each envelop being also individually mailable when non-secured in catalogue form and each having a closure flap at each end and a continuous pocket extending from flap to flap, one or both faces of each envelop having a contents-inspection opening, and binding means adapted to extend through the flaps at the inner ends of the envelops and to secure them into catalogue form.

3. A revisable catalogue comprising a plurality of card receiving envelops adapted to be secured together, each envelop being also individually mailable when non-secured in catalogue form and each having closure means at its outer end and a continuous pocket extending from end to end, one or both faces of each envelop having a contents-inspection opening, and binding means adapted to extend through the inner end portion of said envelops and to secure them into catalogue form.

4. A catalogue-sheet-receiving duplex envelop formed of a single piece folded along parallel lines to form top and bottom edges, the folded over portions being secured along lines substantially parallel to and intermediate the top and bottom edges, thereby to provide two pockets, each having an open end.

5. A catalogue-sheet-receiving duplex envelop formed of a single piece folded along parallel lines to form top and bottom edges, the folded over portions being secured along lines substantially parallel to and intermediate the top and bottom edges, thereby to provide two pockets, each having an open end, one or both faces of each of said pockets having a contents-inspection area.

6. A catalogue-sheet-receiving duplex envelop formed of a single piece folded along parallel lines to form top and bottom edges, the folded over portions being secured along lines substantially parallel to and intermediate the top and bottom edges, thereby to provide two pockets, each having an open end, both faces of each of said pockets having a display opening.

7. A catalogue-sheet-receiving duplex envelop formed of a single piece folded along parallel lines to form top and bottom edges, the folded over portions being secured along lines substantially parallel to and intermediate the top and bottom edges thereby to provide two pockets each of said pockets having two open ends provided with flaps, and at least one face thereof having a display opening.

8. A revisable catalogue consisting of a superposed series of catalogue-sheet-receiving envelops, each of said envelops provided with a closed flap at each end, one flap of each envelope constituting a binding flap, and each envelope having a continuous pocket extending from flap to flap and also having one or both faces provided with a contents-inspection-area, and binding means for said flaps adapted to secure the envelops together in catalogue form.

9. A revisable catalogue consisting of covers, blank sheets and catalogue-receiving envelops, each of said envelops having a combined binding and opening-covering flap and binding means for said parts.

10. A revisable catalogue consisting of covers, blank sheets and catalogue-receiving envelops, each of said envelops having at least one open face and two open ends, and binding means for said parts.

11. A revisable catalogue consisting of covers, blank sheets and catalogue-receiving envelops, each of said envelops having two open faces, and two open ends each of which is provided with flaps, and binding means penetrating said blank sheets and the bases of one set of said flaps.

12. A revisable catalogue comprising a plurality of card receiving envelops and covers adapted to be secured together, each envelop being also individually mailable when non-secured in catalogue form and each having at each end a flap, each envelop also having a continuous pocket extending from flap to flap, one or both faces of each envelop having a contents-inspection opening, and binding means adapted to pass through the flaps at the inner ends of the envelops and to secure them into catalogue form within the covers.

13. A contents-displaying envelop having an open end and having at least one face provided with a display opening terminating at its end remote from the open end of the envelop, in oppositely inclined, guiding edges meeting at an angle.

In testimony whereof, I have signed my name to this specification in the presence of two subscribing witnesses.

ISAAC E. PALMER.

Witnesses:
 JOHN E. MARTIN,
 GEO. C. HAINS.